US006957228B1

(12) United States Patent
Graser (10) Patent No.: US 6,957,228 B1
(45) Date of Patent: Oct. 18, 2005

(54) OBJECT ORIENTED APPARATUS AND METHOD FOR PROVIDING CONTEXT-BASED CLASS REPLACEMENT IN AN OBJECT ORIENTED SYSTEM

(75) Inventor: Timothy James Graser, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/479,363

(22) Filed: Jan. 7, 2000

(51) Int. Cl.[7] .......................... G06F 7/00; G06F 17/00
(52) U.S. Cl. ................. 707/103 R; 707/100; 707/102; 707/1; 717/108; 717/121
(58) Field of Search ............................. 707/1–10, 100, 707/102–103 R, 104; 717/116, 108, 121

(56) References Cited

U.S. PATENT DOCUMENTS

| | | | | |
|---|---|---|---|---|
| 5,437,025 A | * | 7/1995 | Bale et al. ............... | 707/103 R |
| 5,499,333 A | * | 3/1996 | Doundikoff et al. ........ | 707/515 |
| 5,694,598 A | * | 12/1997 | Durand et al. ........... | 707/103 R |
| 5,729,739 A | * | 3/1998 | Cantin et al. ........... | 707/103 R |
| 5,745,755 A | * | 4/1998 | Covey ........................ | 707/203 |
| 5,822,580 A | * | 10/1998 | Leung ..................... | 707/103 R |
| 5,937,409 A | * | 8/1999 | Wetherbee .............. | 707/103 R |
| 5,940,837 A | * | 8/1999 | Samuelsson et al. .... | 707/104.1 |
| 5,943,497 A | * | 8/1999 | Bohrer et al. ............... | 717/121 |
| 5,999,940 A | * | 12/1999 | Ranger .................... | 707/103 R |
| 6,008,806 A | * | 12/1999 | Nakajima et al. ........... | 345/744 |
| 6,016,495 A | * | 1/2000 | McKeehan et al. ..... | 707/103 R |
| 6,085,198 A | * | 7/2000 | Skinner et al. ......... | 707/103 R |
| 6,105,066 A | * | 8/2000 | Hayes, Jr. .................... | 709/226 |
| 6,134,658 A | * | 10/2000 | Multerer et al. ............ | 713/175 |
| 6,226,788 B1 | * | 5/2001 | Schoening et al. ............ | 717/6 |
| 6,295,509 B1 | * | 9/2001 | Driskell ......................... | 707/1 |
| 6,301,584 B1 | * | 10/2001 | Ranger .................... | 707/103 R |
| 6,308,182 B1 | * | 10/2001 | Nishigaya et al. ...... | 707/103 R |
| 6,317,748 B1 | * | 11/2001 | Menzies et al. ........ | 707/103 X |
| 6,343,287 B1 | * | 1/2002 | Kumar et al. .................. | 707/4 |
| 6,363,421 B2 | * | 3/2002 | Barker et al. ............... | 709/223 |
| 6,393,481 B1 | * | 5/2002 | Deo et al. .................... | 709/224 |
| 6,405,209 B2 | * | 6/2002 | Obendorf ................ | 707/103 R |
| 6,430,564 B1 | * | 8/2002 | Judge et al. ............ | 707/103 R |
| 6,438,559 B1 | * | 8/2002 | White et al. ............ | 707/103 R |
| 6,687,717 B1 | * | 2/2004 | Hamilton et al. ........... | 707/203 |

* cited by examiner

Primary Examiner—Jean M. Corrielus
(74) Attorney, Agent, or Firm—Martin & Associates, LLC; Derek P. Martin (57) ABSTRACT

An object oriented mechanism is disclosed that allows class replacement that is based on a specified processing context by replacing existing configuration data with new configuration data within an existing object oriented program. The configuration data is preferably stored in a data structure external to the class definitions to allow modifying the classes without re-compiling the class code. The configuration data includes multiple entries, where each entry is a key-value pair. The key includes information relating to the processing context, and the value includes information relating to the class that corresponds to the key. When an instance of a class needs to be created, the context information is retrieved, a key is generated from a combination of the class information and the context information, and the context-sensitive key is used to retrieve the corresponding class configuration data from the data structure that specifies a particular class. An object that is an instance of the specified class is then created. By generating a key that is context-specific, configuration data for a class can be scoped to a particular processing context, thereby providing context-based class replacement.

7 Claims, 9 Drawing Sheets

OBJECT ORIENTED APPARATUS AND METHOD FOR PROVIDING CONTEXT-BASED CLASS REPLACEMENT IN AN OBJECT ORIENTED SYSTEM

BACKGROUND OF THE INVENTION

1. Technical Field

This invention generally relates to the data processing field. More specifically, this invention relates to the field of object creation in object oriented systems.

2. Background Art

Since the dawn of the computer age, overall computer system technology has evolved and progressed through advances in both hardware performance and software programming techniques. As the complexity of computer hardware and software increases, the need to efficiently and effectively develop new software becomes more acute. Software development costs have continued to rise because complex programs take more time, and hence more money, to produce. Object oriented programming (OOP) is one way computer programmers have sought to reduce the time and costs associated with developing complex software. A single object in OOP represents an individual operation or a group of operations that are performed by a computer system upon information controlled by the object. Objects can be thought of as autonomous agents that work together to perform certain tasks. Sometimes entire computer programs are made up of groupings of objects and sometimes objects are simply accessed by more traditional computer programs to perform one specific task or subtask.

The goal of using object oriented programming is to create small, reusable sections of program code known as objects that can be quickly and easily combined and re-used to create new programs. This is similar to the idea of using the same set of building blocks again and again to create many different structures. The modular and reusable aspects of objects will typically speed development of new programs, thereby reducing the costs associated with the development cycle. In addition, by creating and re-using a group of well-tested objects, a more stable, uniform, and consistent approach to developing new computer programs can be achieved.

Although object oriented programming offers significant improvements over other programming types, program development still requires significant amounts of time and effort, especially if no preexisting objects are available as a starting point. Consequently, one approach has been to provide a program developer with a set of pre-defined, interconnected classes that create a set of objects. Such pre-defined classes and libraries are typically called object frameworks. Frameworks essentially provide a prefabricated structure for a working program by defining certain classes, class relationships, and methods that a programmer may easily use by appropriate subclassing to generate a new object oriented program.

A problem, though, that exists with any object oriented program is the difficulty of modifying the configuration of a specific object (by modifying its class definition) to fit a specific need, improve the program, or alternate between two or more implementations of that program. Each object oriented class is characterized by configuration data that defines attributes of the class. Changing the way objects that are members of a class behave requires changing the configuration data for that class. The most common way of changing an object oriented (OO) program so that the program uses a different class implementation than the existing class, would require changing the source code wherever the code creates the objects, rebuilding the program, and installing the program on all the systems intended to use the new class. If there are many different sets of such classes that could be changed, or various physical locations for creation of the objects, the combinatorial explosion of different versions of the program becomes completely unmanageable.

To address this problem, a known method for class replacement has been implemented that uses class configuration data that is separate from and external to a class, and can thus be changed to create a new replacement class without rebuilding the program. This approach has been used in the San Francisco framework developed by IBM. The class replacement in the San Francisco framework uses keys known as tokens that are stored in a table of configuration data along with the class names that correspond to each token. When an instance of a class is needed, its token is passed to a factory object, which determines from the configuration data the class that corresponds to the token, and instantiates an instance of that class.

One problem with the class replacement approach used in the San Francisco framework is that the configuration data is global to the object oriented system. Sometimes it is desirable to have class configurations that vary according to a specific processing context or environment. For example, a company may have different divisions, and each division may use its own specific way of performing currency conversions for transactions. These different divisions need a way to perform class replacement that is based to their processing environment, which is not currently supported in version 1.4.4 of the San Francisco framework. There are ways to retrieve context information in the San Francisco framework, but no way to base the class replacement according to this context information. Without an apparatus and methods for easily changing configuration data in an object oriented system to perform context-based class replacement, the computer industry will have to endure the limitations of prior art class replacement techniques.

DISCLOSURE OF INVENTION

According to the preferred embodiments, an object oriented mechanism is disclosed that allows class replacement that is based on a specified processing context by replacing existing configuration data with new configuration data within an existing object oriented program. The configuration data is preferably stored in a data structure external to the class definitions to allow modifying the classes without re-compiling the class code. The configuration data includes multiple entries, where each entry is a key-value pair. The key includes information relating to the processing context, and the value includes information relating to the class that corresponds to the key. When an instance of a class needs to be created, the context information is retrieved, a key is generated from a combination of the class information and the context information, and the context-sensitive key is used to retrieve the corresponding class configuration data from the data structure that specifies a particular class. An object that is an instance of the specified class is then created. By generating a key that is context-specific, configuration data for a class can be scoped to a particular processing context, thereby providing context-based class replacement.

BRIEF DESCRIPTION OF DRAWINGS

The preferred exemplary embodiments of the present invention will hereinafter be described in conjunction with the appended drawings, where like designations denote like elements, and.

BEST MODE FOR CARRYING OUT THE INVENTION

The present invention relates to object oriented programming techniques. For those individuals who are not generally familiar with object oriented programming, the Overview section below presents many of the concepts that will help to understand the invention.

1. Overview

Object Oriented Technology v. Procedural Technology

Object oriented programming is a method of implementation in which programs are organized as cooperative collections of objects, each of which represents an instance of some class, and whose classes are all members of a hierarchy of classes united via inheritance relationships. Object oriented programming differs from standard procedural programming in that it uses objects, not algorithms, as the fundamental building blocks for creating computer programs. This difference stems from the fact that the design focus of object oriented programming technology is wholly different than that of procedural programming technology.

The focus of procedural-based design is on the overall process that solves the problem; whereas, the focus of object oriented design is on how the problem can be broken down into a set of autonomous entities that can work together to provide a solution. The autonomous entities of object oriented technology are, of course, objects. Said another way, object oriented technology is significantly different from procedural technology because problems are broken down into sets of cooperating objects instead of into hierarchies of nested computer programs or procedures.

Thus, a pure object oriented program is made up of code entities called objects. Each object is an identifiable, encapsulated piece of code that provides one or more services when requested by a client. Conceptually, an object has two parts, an external object interface and internal object data. In particular, all data is encapsulated by the object interface such that other objects must communicate with that object through its object interface. The only way to retrieve, process or otherwise operate on the encapsulated data is through the methods defined on the object. This protects the internal data portion of the object from outside tampering. Additionally, because outside objects have no access to the internal implementation of an object, that internal implementation can change without affecting other aspects of the program.

In this way, the object system isolates the requestor of services (client objects) from the providers of services (server objects) by a well defined encapsulating interface. Thus, in the classic object model, a client object sends request messages (e.g., method calls) to server objects to perform any necessary or desired function. The message identifies a particular server object and specifies what method is to be performed by the server object, and also supplies any required parameters. The server object receives and interprets the message, and can then determine what service to perform.

Because all operations on an object are expressed as methods called from one object to another, methods can be called by objects in other processes. Objects that reside in one process and that are capable of calling methods on an object in another process (such as a process on a remote computer system) are known as distributed objects.

Many distributed object systems allow interaction between objects in remote locations over a communications link. In a distributed object system a "client object" in one location calls methods on a "server object" in another location, which may be a remote location. The client object—server object interactions form the basis for the distributed object system.

Another central concept in object oriented programming is the class. A class is a template that defines a type of object. A class outlines the makeup of objects that belong to that class. By defining a class, objects can be created that belong to the class without having to rewrite the entire definition for each new object as it is created. This feature of object oriented programming promotes the reusability of existing definitions and promotes efficient use of program code. Each class has corresponding configuration data that determines the features or attributes of the class. Changing the configuration data for a class changes the existing class to a new class.

There are many computer languages that presently support object oriented programming techniques. For example, Smalltalk, Object Pascal, C++ and Java are all examples of programming languages that support object oriented programming to one degree or another.

Frameworks

As described in the Background section, OO frameworks are prefabricated structures of classes and class relationships that allow a programmer to extend the framework to build an OO program that performs desired functions. While in general terms an OO framework can be properly characterized as an OO solution, there is nevertheless a fundamental difference between a framework and a traditional OO program. The difference is that frameworks are designed in a way that permits and promotes customization and extension of certain aspects of the solution. In other words, framework mechanisms amount to more than just a solution to the problem. The mechanisms provide a living solution that can be customized and extended to address individualized requirements that change over time. Of course, the customization/extension quality of framework mechanisms is extremely valuable to purchasers (referred to herein as framework consumers) because the cost of customizing or extending a framework is much less than the cost of replacing or reworking an existing solution.

Therefore, when framework designers set out to solve a particular problem, they do more than merely design individual objects and how those objects interrelate. They also design the core function of the framework (i.e., the part of the framework that should not be subject to potential customization and extension by the framework consumer) and the extensible function of the framework (i.e., that part of the framework that is to be subject to potential customization and extension.). Frameworks are mentioned here as one possible type of OO program that could benefit from the invention disclosed herein.

IBM's San Francisco Framework

IBM introduced a framework product known as "San Francisco" that provides a framework for programming business applications, such as a general ledger or order processing application. San Francisco provides a set of base services such as persistence and transaction support as well as a set of common business objects such as currency and business partner. Above the base layer, San Francisco provides frameworks that define the basis of an application such as a general ledger or order management with well-defined extension points. A user may take advantage of the power and flexibility of San Francisco by providing user-defined extensions that customize San Francisco for a particular application. San Francisco thus provides a "short cut" to custom programming an entire application by providing pre-packaged code that is easily extended by a user to provide a custom application.

The San Francisco framework provides extension points that allow a user to customize the framework according to the user's needs. One specific type of extension point is a "policy", which is a way for a user to define how the framework behaves. For example, an ExchangeRatePolicy class would allow the user to extend this class to define the specific algorithm used to calculate exchange rates.

As described in the Background section, the San Francisco framework provides a class replacement mechanism, but the configuration data for class replacement is global, and therefore cannot be based on a particular processing context. The San Francisco framework also allows retrieving context information, but this information cannot be used in the class replacement scheme. In addition, retrieving data such as policy objects associated with a context in the San Francisco framework typically requires communication with remote objects, which results in substantial performance penalties when retrieving the data.

Factories

A factory is a part of a framework or other OO program used for the creation of an object. The factory generally consists of an object or group of objects working together to create a new entity (e.g., object) for the program. In many cases, the factory will determine at runtime the choice of the location and function of a class by using existing guidelines, called configuration data, and abstract interfaces or strings, called class tokens, entered in by the framework or OO program designer.

Notation

There is, as yet, no uniformly accepted notation for communicating object oriented programming ideas. The notation used in this specification is very similar to that known in the programming industry as Booch notation, after Grady Booch. Mr. Booch is the author of *Object-Oriented Analysis and Design With Applications,* 2nd ed. (1994), available from The Benjamin/Cummings Publishing Company, Inc. Use of Booch notation concepts within this specification should not be taken to imply any connection between the inventors and/or the assignee of this patent application and Mr. Booch or Mr. Booch's employer. The notational system used by Mr. Booch is more fully explained at Chapter 5, pp. 171–228 of the aforementioned book. The notational system used herein will be explained generally below. Other notational conventions used herein will be explained as needed.

2. Detailed Description

An apparatus and method in accordance with the preferred embodiments provide context-based class replacement by appending context information onto an identifier that is used to retrieve configuration data for a class to be instantiated. In this manner context-sensitive information can be stored in the data structure that contains class configuration data. The advantages of the present invention are presented below in conjunction with the description of the preferred embodiments.

Figure 1:
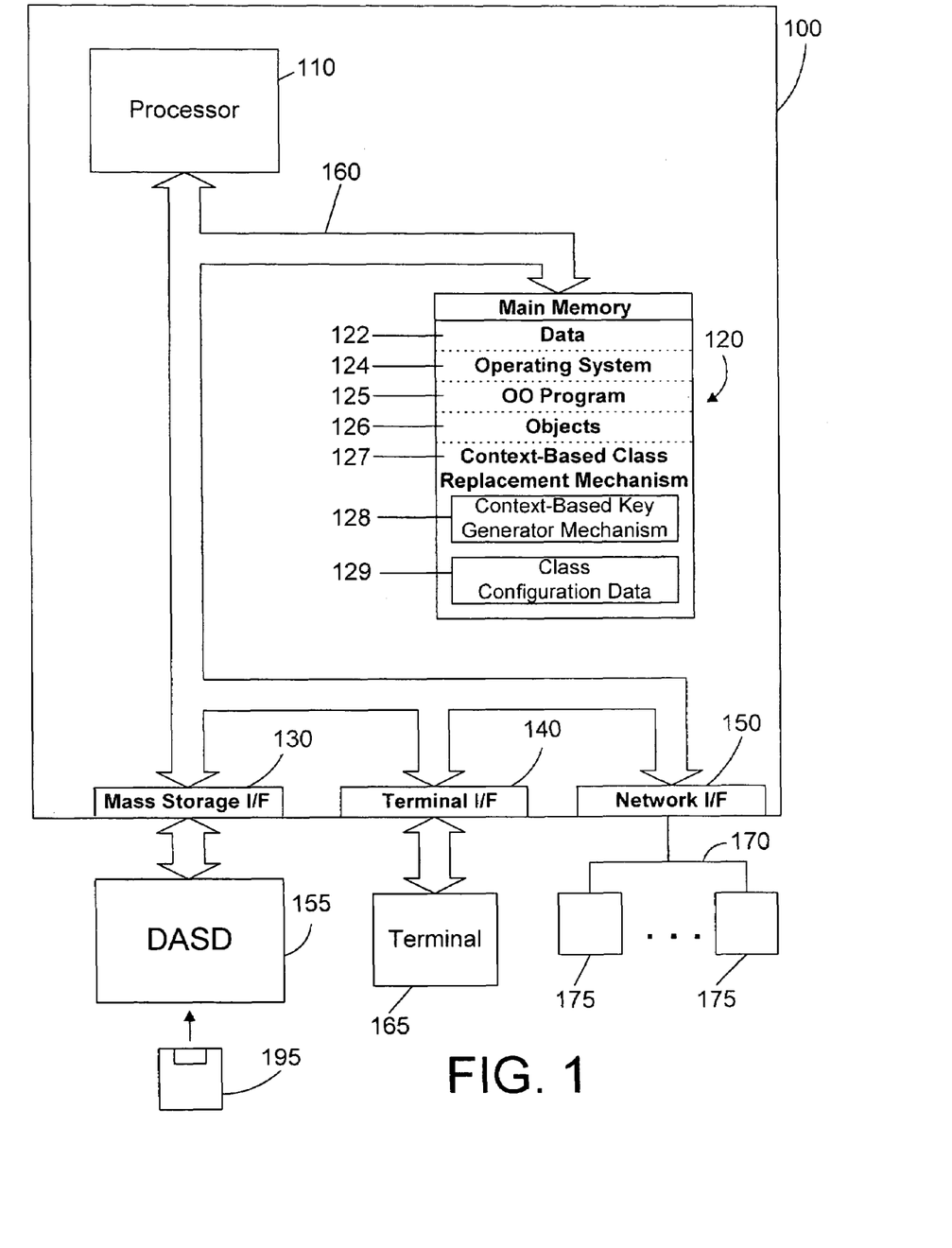
FIG. 1 is a block diagram of a computer system according to a preferred embodiment of the present invention.

Referring to FIG. 1, a computer system 100 in accordance with the preferred embodiment is an IBM AS/400 computer system. However, those skilled in the art will appreciate that the mechanisms and apparatus of the present invention apply equally to any computer system, regardless of whether the computer system is a complicated multi-user computing apparatus a single user workstation, or an embedded control system. As shown in FIG. 1, computer system 100 comprises a processor 110, a main memory 120, a mass storage interface 130, a terminal interface 140, and a network interface 150. These system components are interconnected through the use of a system bus 160. Mass storage interface 130 is used to connect mass storage devices (such as a direct access storage device 155) to computer system 100. One specific type of direct access storage device 155 is a floppy disk drive, which may store data to and read data from a floppy disk 195.

Main memory 120 in accordance with the preferred embodiments contains data 122, an operating system 124, an object oriented program 125, objects 126, and a context-based class replacement mechanism 127. Context-based replacement mechanism 127 includes a context-based key generator mechanism 128 and class configuration data 129. Context-based replacement mechanism 127 performs class replacement by returning configuration data for a class that is specified in a particular processing context.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 122, operating system 124, OO program 125, objects 126, and context-based class replacement mechanism 127 are shown to reside in main memory 120, those skilled in the art will recognize that these items are not necessarily all completely contained in main memory 120 at the same time. It should also be noted that the term "memory" is used herein to generically refer to the entire virtual memory of computer system 100.

Data 122 represents any data that serves as input to or output from any program in computer system 100. Operating system 124 is a multitasking operating system known in the industry as OS/400; however, those skilled in the art will appreciate that the spirit and scope of the present invention is not limited to any one operating system. Object oriented program 125 is object oriented or object based, and requires the instantiation of object oriented objects 126 during its execution. Context-based class replacement mechanism 127 is used to create one or more objects (e.g., 126) using configuration data 129 that resides outside of the class definition. In this manner a class may be modified (or replaced) with a new class by simply changing the external class configuration data rather than changing the class definition, which would require re-compiling the class. To scope a class to a particular context, context-based class replacement mechanism 127 includes class configuration data 129, and also includes a context-based key generator mechanism 128 that creates context-specific keys (or tokens) for accessing the class configuration data. This means that the same class may have different definitions depending on the processing context. For example, let's assume that there is a CurrencyConversionPolicy class defined. The implementation of this class for one division in a company (which corresponds to a processing context) may be different than the implementation for a different division (which corresponds to a different processing context). Both class definitions may be included in class configuration data 129, but are stored with different keys. The first key suitably includes context information for the first division, and the second key suitably includes context information for the second division. In this manner, an instance of the proper class may be created by generating a key that includes the context information, and by accessing the class configuration data 129 that corresponds to that key.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 124. Operating system 124 is a sophisticated program that manages the resources of computer system 100. Some of these resources are processor 110, main memory 120, mass storage interface 130, terminal interface 140, network interface 150, and system bus 160.

Although computer system 100 is shown to contain only a single processor and a single system bus, those skilled in the art will appreciate that the present invention may be practiced using a computer system that has multiple processors and/or multiple buses. In addition, the interfaces that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Terminal interface 140 is used to directly connect one or more terminals 165 to computer system 100. These terminals 165, which may be non-intelligent (i.e., dumb) terminals or fully programmable workstations, are used to allow system administrators and users to communicate with computer system 100. Note, however, that while terminal interface 140 is provided to support communication with one or more terminals 165, computer system 100 does not necessarily require a terminal 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include: recordable type media such as floppy disks (e.g., 195 of FIG. 1) and CD ROM, and transmission type media such as digital and analog communications links.

Figure 2:
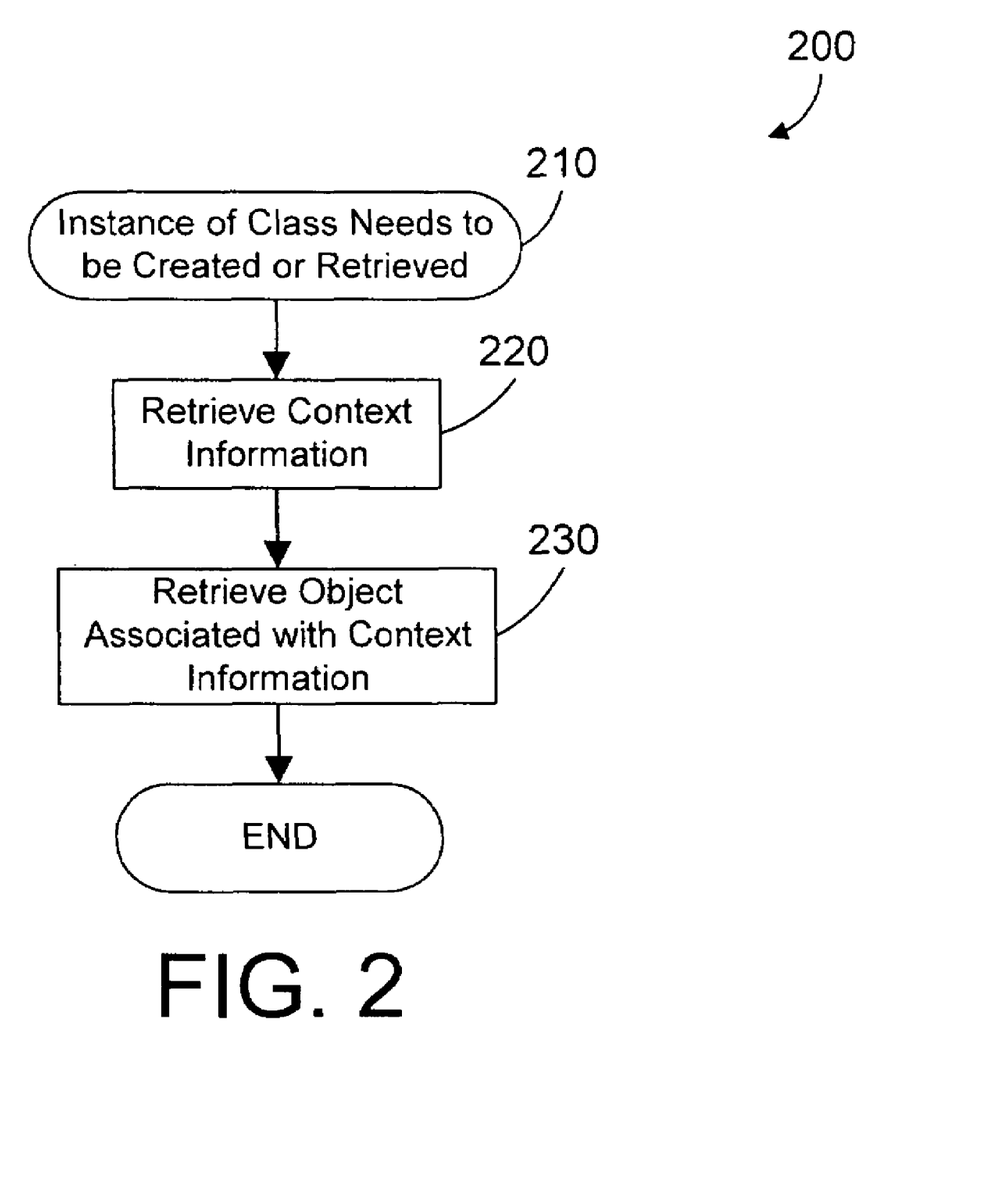
FIG. 2 is a flow diagram of a method for instantiating an object based on context information.
Figure 3:
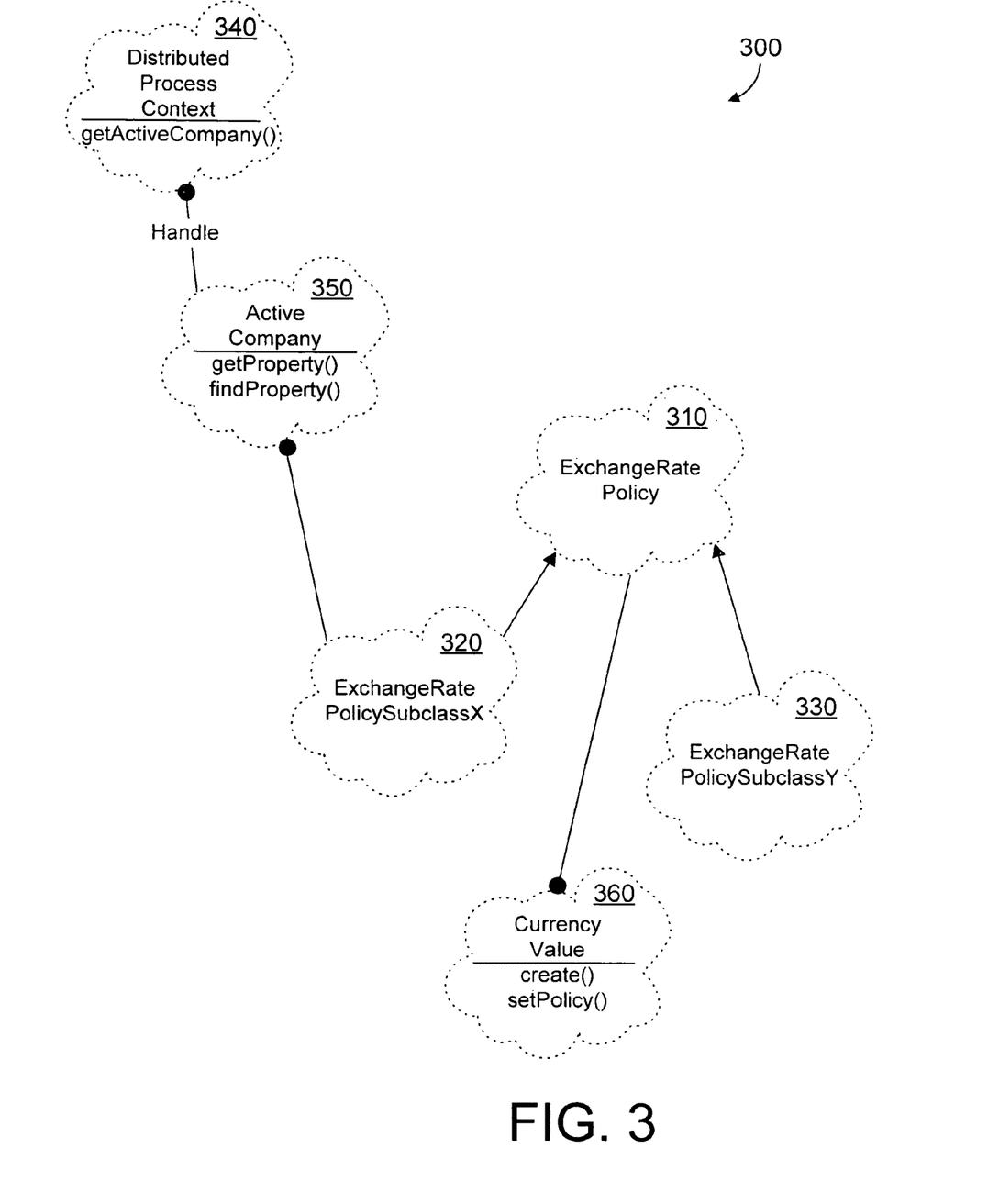
FIG. 3 is a class diagram showing classes that may be used to implement the method of FIG. 2.
Figure 4:
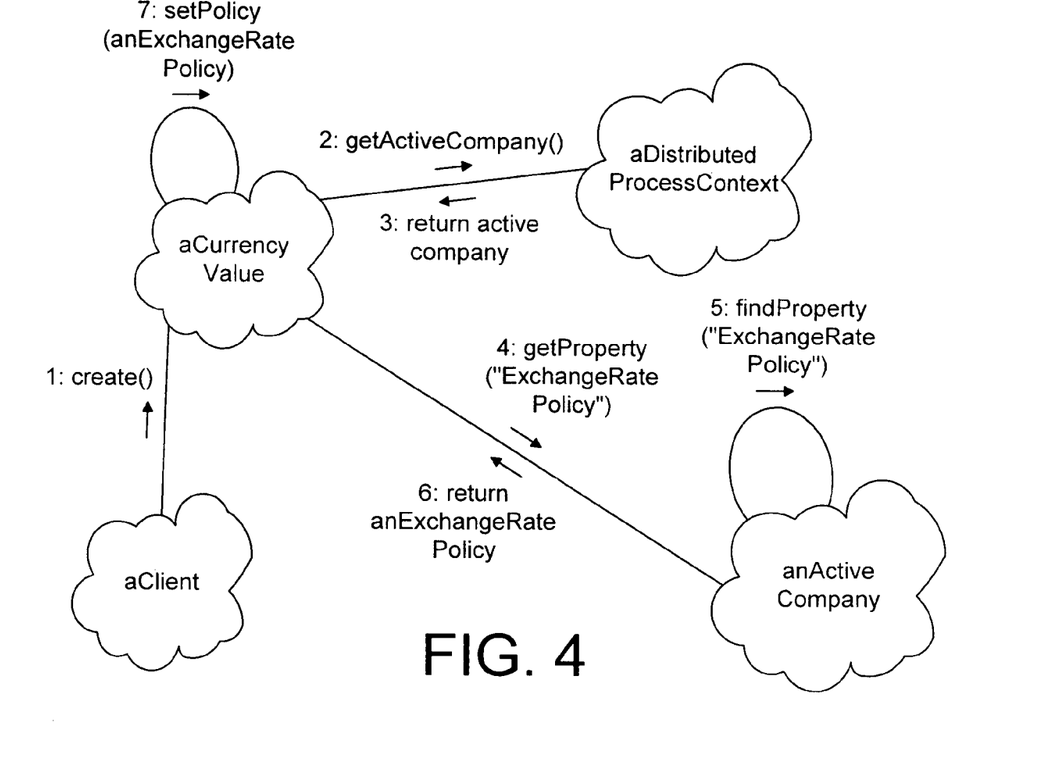
FIG. 4 is an object diagram illustrating a method for instantiating a class in accordance with the flow diagram of FIG. 2 and the class diagram of FIG. 3.
Figure 5:
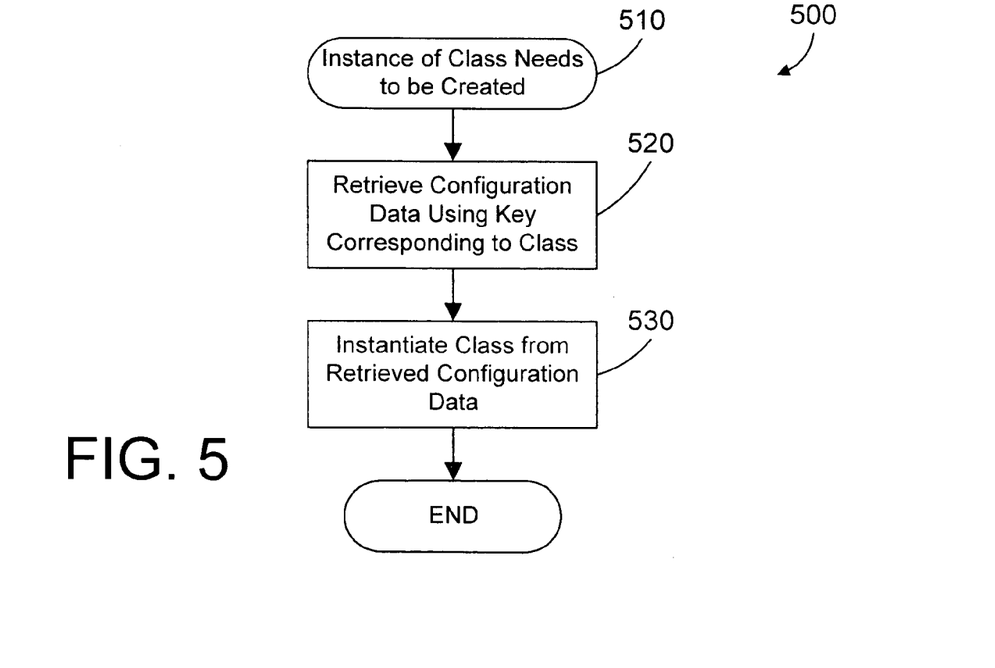
FIG. 5 is a flow diagram of a method for instantiating an object using class replacement without using context information.
Figure 6:
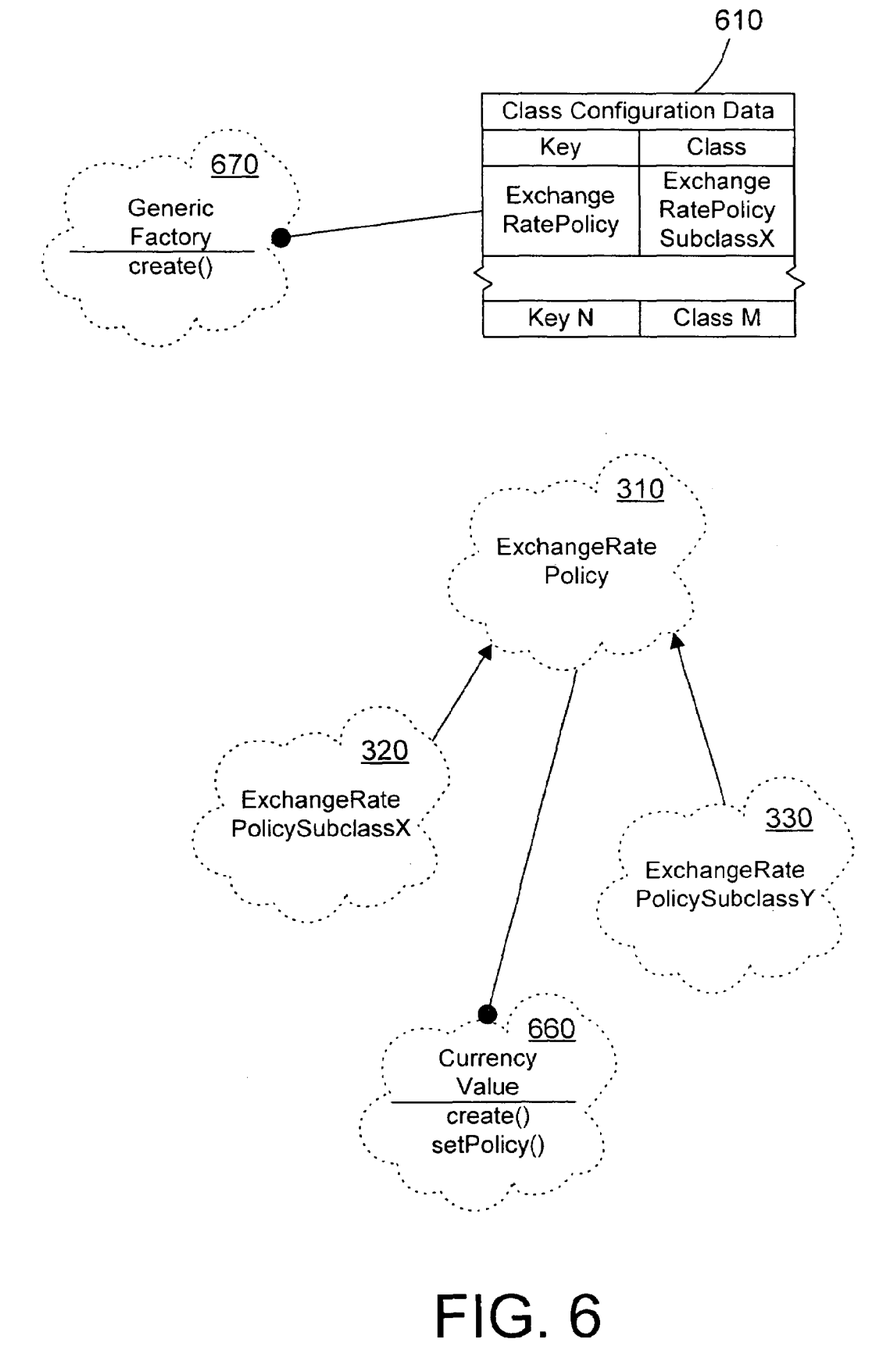
FIG. 6 is a class diagram of the classes that may be used to implement the method of FIG. 5, as well as a data structure for the class configuration data.
Figure 7:
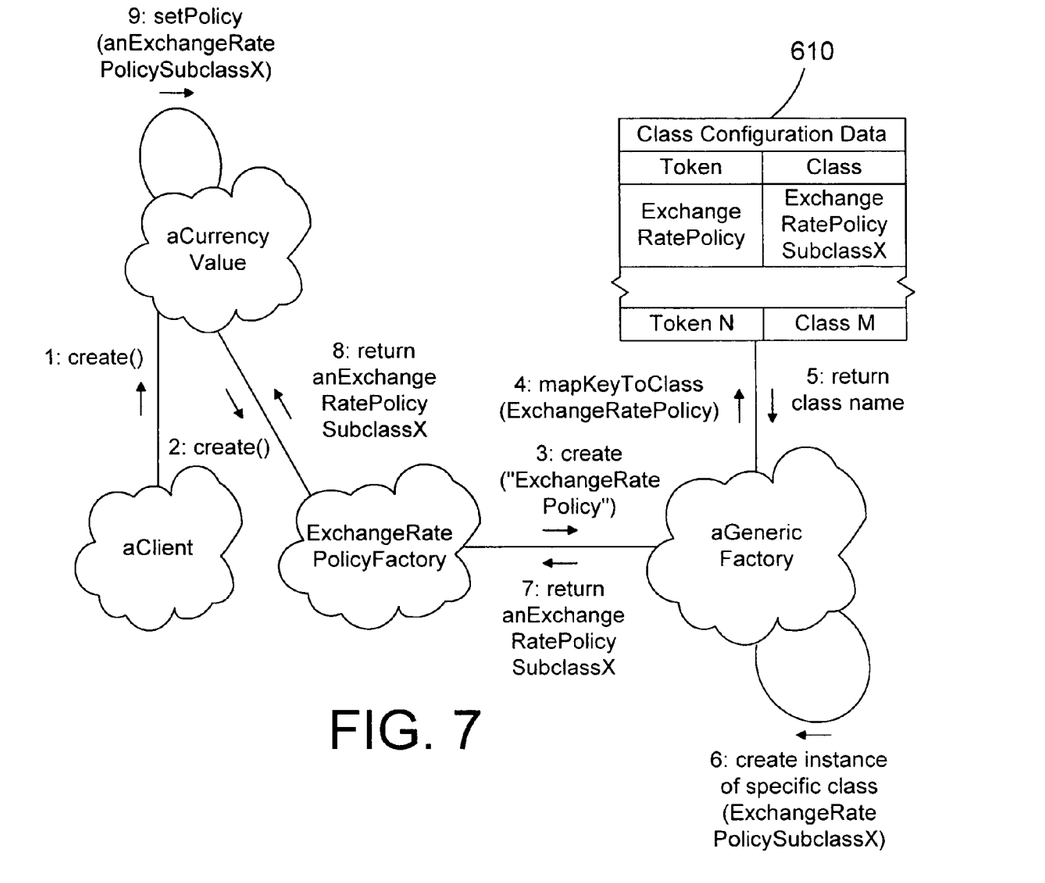
FIG. 7 is an object diagram illustrating a method for instantiating a class in accordance with the flow diagram of FIG. 5 and the class diagram of FIG. 6.

Different mechanisms and methods are discussed herein for the purpose of providing background information that will help in understanding the preferred embodiments and its advantages over these other possible mechanisms and methods. For example, one specific way of retrieving context information is shown in FIGS. 2–4. Another specific way of performing class replacement is shown in FIGS. 5–7. The preferred embodiments are then discussed with reference to FIGS. 8–10. Each of these are discussed in turn below.

Referring to FIG. 2, a method 200 for instantiating or retrieving an object based on its current processing context is shown. This method is executed when an instance of a particular class needs to be created (step 210). First, the context information is retrieved (step 220), and the object is then retrieved based on the retrieved context information (step 230). Note that if the object does not exist, it will have to be instantiated before it can be retrieved in step 230.

FIG. 3 illustrates a set of classes 300 that may implement method 200 of FIG. 2. These classes 300 generally represent one specific implementation of method 200 that is similar to the implementation found within the San Francisco framework, but the implementation of FIG. 3 has been extremely simplified for the purpose of illustration. An ExchangeRatePolicy class 310 is provided as an example of any suitable policy, such as any extension point within the San Francisco framework. For the purpose of illustration, ExchangeRatePolicy includes two concrete subclasses ExchangeRatePolicySubclassX 320 and ExchangeRatePolicySubclassY 330. For this example, we assume that ExchangeRatePolicySubclassX 320 is the policy that is desired in a selected processing context. A DistributedProcessContext class 340 is a class the provides local context information for the currently-executing process, and includes a getActiveCompany( ) method that determines which company is the active company. In this specific example, the active company corresponds to a selected processing context.

The DistributedProcessContext class has a "contains" relationship with an ActiveCompany class 350 via a unique identifier referred to herein as a "handle". The ActiveCompany 350 in turn has a "contains" relationship with the specific ExchangeRatePolicySubclassX 320 that is the appropriate policy subclass for this active company. The ActiveCompany class 350 defines methods getProperty( ) that tells the active company that a property is needed, and findProperty( ) that the active company calls to find the needed property. A CurrencyValue class 360 is also provided that has a "contains" relationship with the ExchangeRatePolicy class 310. The CurrencyValue class is one specific example of a class that may need a corresponding policy to perform its functions. For this specific example, we assume that the ExchangeRatePolicy class is a class that determines how currency values are calculated using an exchange rate algorithm, and that the concrete subclasses 320 and 330 are specific user-defined extensions that contain two specific implementations for calculating currency values using exchange rates. The CurrencyValue class includes a create( ) constructor method and a setpolicy( ) method that sets the policy during the creating of a CurrencyValue object, thereby assuring that an instance of the proper ExchangeRatePolicy subclass is used.

The object diagram of FIG. 4 shows the steps in creating an instance of the CurrencyValue class in accordance with the method 200 of FIG. 2 using the classes 300 in FIG. 3. First, a client object invokes the create( ) constructor method on the CurrencyValue class (step 1). At this point we don't know which specific ExchangeRatePolicy subclass is needed, because this depends on the processing context. The getActiveCompany( ) method on the aDistributedProcessContext object is then invoked (step 2), which causes the aDistributedProcessContext object to return the active company (step 3). The CurrencyValue then invokes the getProperty( ) method on the anActiveCompany object that corresponds to the active company returned in step 3, passing the property name for ExchangeRatePolicy as a parameter (step 4). In response, the anActiveCompany object invokes its findProperty( ) method (step 5) to find an instance of a concrete subclass of ExchangeRatePolicy among its other properties, and this instance is returned (step 6). For this specific example, an object anExchangeRatePolicySubclassX is returned in step 6. Once the correct anExchangeRatePolicySubclassX object is returned from the active company in step 6, the CurrencyValue sets this returned object as its contained policy (step 7). The result of the steps in FIG. 4 is the retrieval of a concrete anExchangeRatePolicy object that corresponds to a particular processing context, and the creation of a aCurrencyValue object that contains the proper ExchangeRatePolicy object for the processing context.

While the steps of FIG. 4 provide the desired function of retrieving an object according to a selected processing context, this is done at considerable expense. The step of retrieving the active company from the distributed processing context in step 2, and the call to get the policy from the company in steps 4 and 5 are relatively expensive. Typically, the active company object is in a remote location. This means that significant network overhead is incurred for these steps. For some types of objects, this penalty is not significant because the frequency of creating such objects is relatively low. However, for some objects, such as a currency value object, the frequency of creation is very high. In fact, in a general ledger or order processing system, the generation of currency values is done very frequently. Accessing a remote ActiveCompany object each time a currency value object needs to be created results in excessive performance penalties that cannot be tolerated.

Referring now to FIG. 5, a method 500 for performing class replacement is shown. Method 500 assumes that configuration data for classes are stored in a data structure that is external to the class definition. This allows the definition of a class to be changed without re-compiling the class. This configuration data could be any information that identifies which class should be instantiated, whether the information is simply an identifier (such as a class name), or more extensive information that determines attributes of the class to be instantiated.

Method 500 is performed when an instance of a class needs to be created (step 510). First, a key that uniquely identifies the class is used to retrieve configuration data for the class (step 520). Once the configuration data is retrieved, it is used to create an instance of the class (step 530). Note that method 500 will likely not be used in creating all objects, but only a specific type of object whose configuration data is stored in an external data structure.

FIG. 6 illustrates a set of classes and a data structure for holding class replacement configuration data that may implement method 500 of FIG. 5. These classes and data structure generally represent one specific implementation of method 500 that is similar to the implementation found within the San Francisco framework, but has been extremely simplified for the purpose of illustration. The ExchangeRatePolicy class 310 is present, along with the two concrete subclasses, ExchangeRatePolicySubclassX 320 and ExchangeRatePolicySubclassY 330, the same as in FIG. 3. The CurrencyValue class 660 includes a create( ) method and a setpolicy( ) method, similar to the methods shown in FIG. 3. In addition, a generic factory class 670 is defined that is used to create an instance of the ExchangeRatePolicy class by accessing configuration data residing in a data structure 610 that is external to the definition of the ExchangeRatePolicy class. Data structure 610 suitably contains key-value pairs, where the key is a unique identifier for a class, and the value identifies which concrete subclass to instantiate for the class represented by the key. When the create( ) constructor on the CurrencyValue class is invoked, it invokes in turn the create( ) constructor method on the GenericFactory, which then locates using the key an appropriate entry in the class configuration data 610 that corresponds to the class to be instantiated, and creates an instance of the class based on the configuration data that corresponds to that key. Note that the specific example in FIG. 6 assumes that the configuration data is a name of a particular class, and that the GenericFactory will know how to create an instance of that class based on the class name alone.

The object diagram of FIG. 7 shows the steps in creating a CurrencyValue object in accordance with the method 500 of FIG. 5 using the classes and data structure for class configuration data shown in FIG. 6. First, a client object invokes the create( ) constructor method on the CurrencyValue class (step 1). This causes the create( ) constrictor method on a factory for the ExchangeRatePolicy class to be invoked (step 2). However, at this point it is not known which concrete subclass of ExchangeRatePolicy to instantiate. A create( ) method on aGenericFactory is invoked next, passing the ExchangeRatePolicy key as an argument (step 3). In response, the aGenericFactory object performs a mapTokenToClass( ) function that passes a token corresponding to the ExchangeRatePolicy class to the data structure 610 that contains the class configuration data (step 4), and using the token as a key, determines which specific class name corresponds to the token. This class name is returned to the generic factory in step 5. The generic factory then creates an instance of the class specified by the class name (step 6). The instance of the class (anExchangeRatePolicySubclassX) is then returned to the ExchangeRatePolicyFactory in step 7. Finally, the anExchangeRatePolicySubclassX object is returned to the constructor for the CurrencyValue class (step 8), which then sets its policy to the object just returned (step 9). The steps in FIG. 7 perform what is referred to herein as a "class replacement" because an existing class can be replaced by a new class by simply changing an entry in the class configuration data structure 610. The next time an instance of a class needs to be created, the class name returned from the data structure 610 will correspond to a new class, and the anExchangeRatePolicy object will thus be an instance of a new class without re-compiling the existing class definitions.

While the class replacement discussed above with reference to FIGS. 5–7 works well in many applications, the class configuration data in data structure 610 is global to the entire system. For this reason, this type of class replacement cannot be scoped to a particular processing context. In other words, different divisions of a company that have different processing contexts will have to use the same options for currency conversion policies. This limitation is an excessive constraint on the flexibility of the system, because it may be desirable, or even necessary, to provide different ways to compute exchange rates (and hence, currency values) depending on the processing context.

Figure 8:
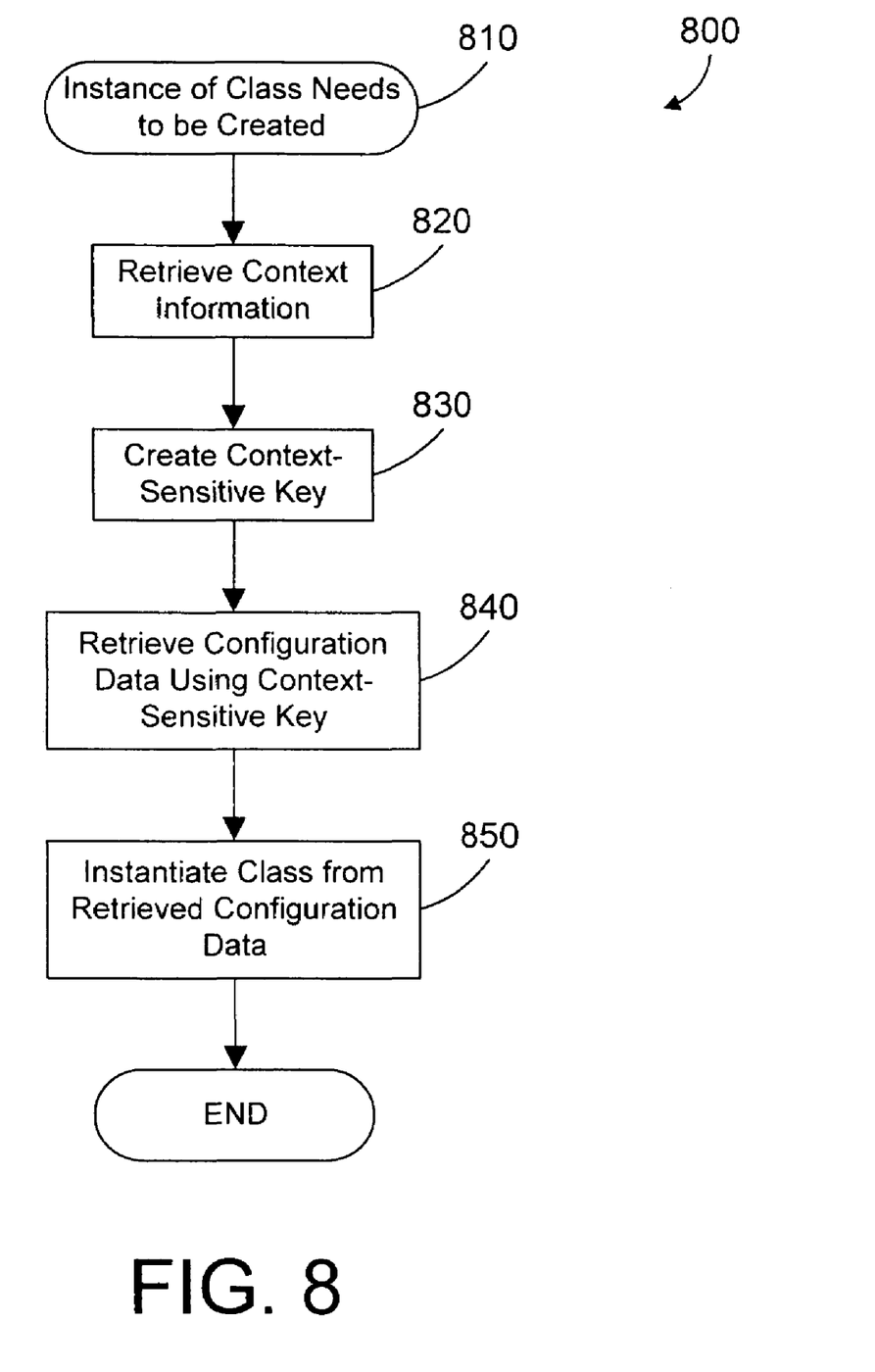
FIG. 8 is a flow diagram of a method for instantiating an object in accordance with the preferred embodiments of the present invention.

Referring now to FIG. 8, a method 800 for creating an object in a way that provides context-based class replacement is invoked when an instance of a class needs to be created (step 810). Note that in the preferred embodiments, the execution of method 800 is suitably initiated when only particular types of objects need to be created. First, context information is retrieved (step 820). A context-sensitive key is then created (step 830), and used to retrieve configuration data for the class to be instantiated (step 840). In the preferred embodiments, the configuration data resides external to the class definition. This context-sensitive configuration data is then used to create the instance of the class (step 850).

Figure 9:
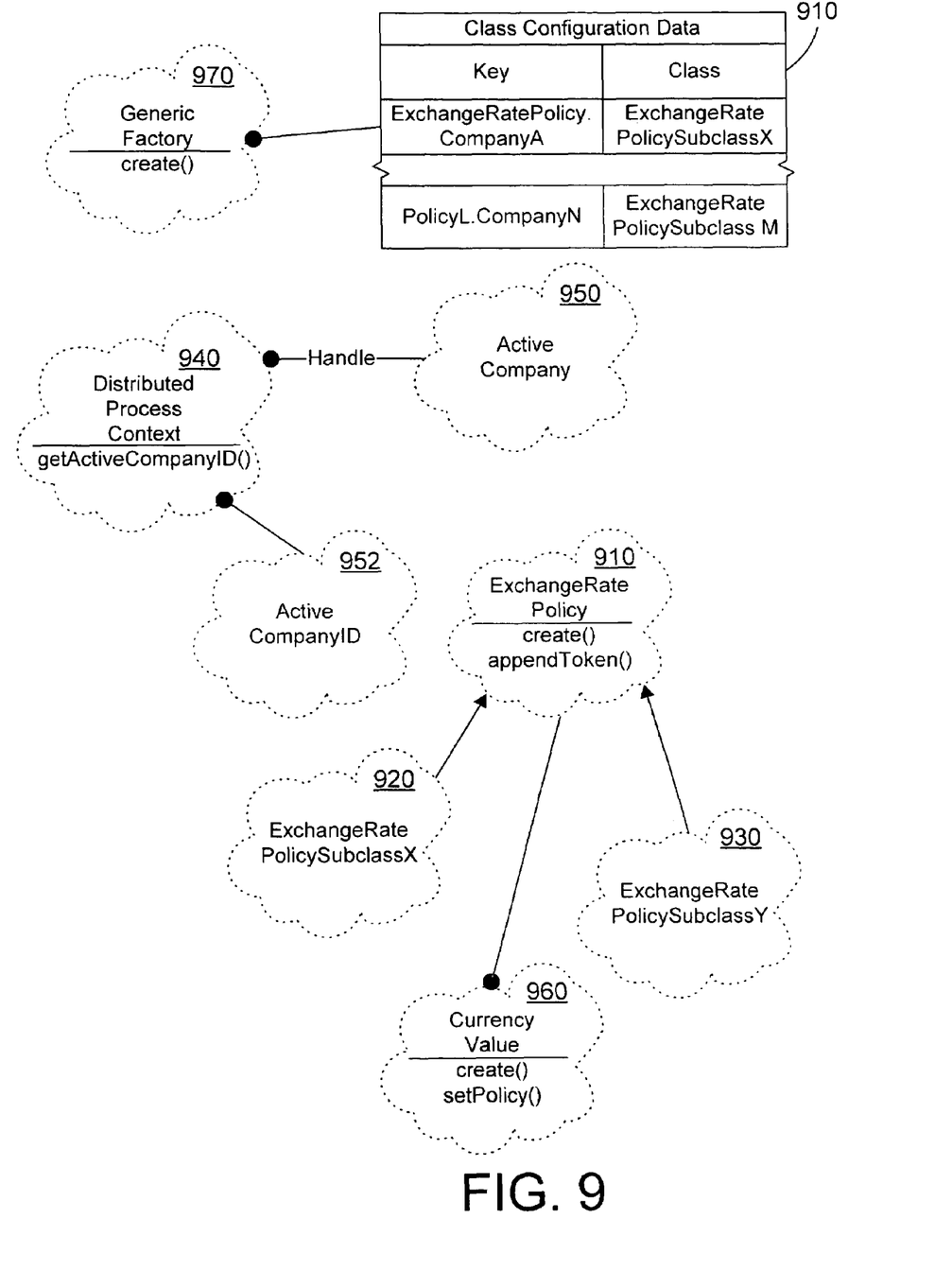
FIG. 9 is a class diagram of exemplary classes and a data structure that could be used to implement the method of FIG. 8.

FIG. 9 illustrates a set of classes and a data structure for holding configuration data that may implement method 800 of FIG. 8 in accordance with a preferred embodiment of the invention. A GenericFactory class 970 is defined that references an external data structure 910, and that includes a create( ) method that causes the generic factory to access data structure 910 using a key that includes context information to retrieve corresponding class configuration data (i.e., a class name) from the data structure 910. Data structure 910 preferably includes a table of key-value pairs, where the key is a token that is generated using both a class identifier and context information, and where the corresponding value is a specification of which class corresponds to the token. The data structure 910 is preferably external to the classes that are represented therein so that class definitions may be updated (thus effecting class replacement) without re-compiling the class definitions.

In the preferred embodiments, the class token and context information are appended to provide a context-sensitive token. In this manner a token ExchangeRatePolicy.CompanyA as shown in FIG. 9 is a key that is scoped to a particular processing context (e.g., CompanyA). A different entry might have a token of ExchangeRatePolicy.CompanyB, and the class configuration data could thus be different than the entry for CompanyA. The preferred embodiments thus allow each entry in data structure 910 to be scoped to a selected processing context.

The ExchangeRatePolicy class 910 and its concrete subclasses 920 and 930 are similar to those corresponding classes 310, 320 and 330 shown in FIGS. 3 and 6. One significant difference is that the ExchangeRatePolicy class, in addition to its create( ) constructor method, also defines an appendToken( ) method that is invoked to create a context-based token (or key) for a class. By creating unique keys for each class/context combination, class replacement that is scoped to a selected processing context is now possible.

CurrencyValue class 960 includes a create( ) constructor method and a setpolicy( ) method, similar to the CurrencyValue class 360 in FIG. 3 and 660 in FIG. 6. The CurrencyValue class has a "contains" relationship with the ExchangeRatePolicy class. A DistributedProcessContext class 940 is also provided, which has a "contains" relationship with an ActiveCompany class 950 and an ActiveCompanyID class 952. The ActiveCompanyID is preferably a text string that uniquely identifies the active company. The DistributedProcessContext class defines a method getActiveCompanyID( ) that retrieves and returns the identifier (e.g., text string ActiveCompanyID) that uniquely identifies the active company.

Figure 10:
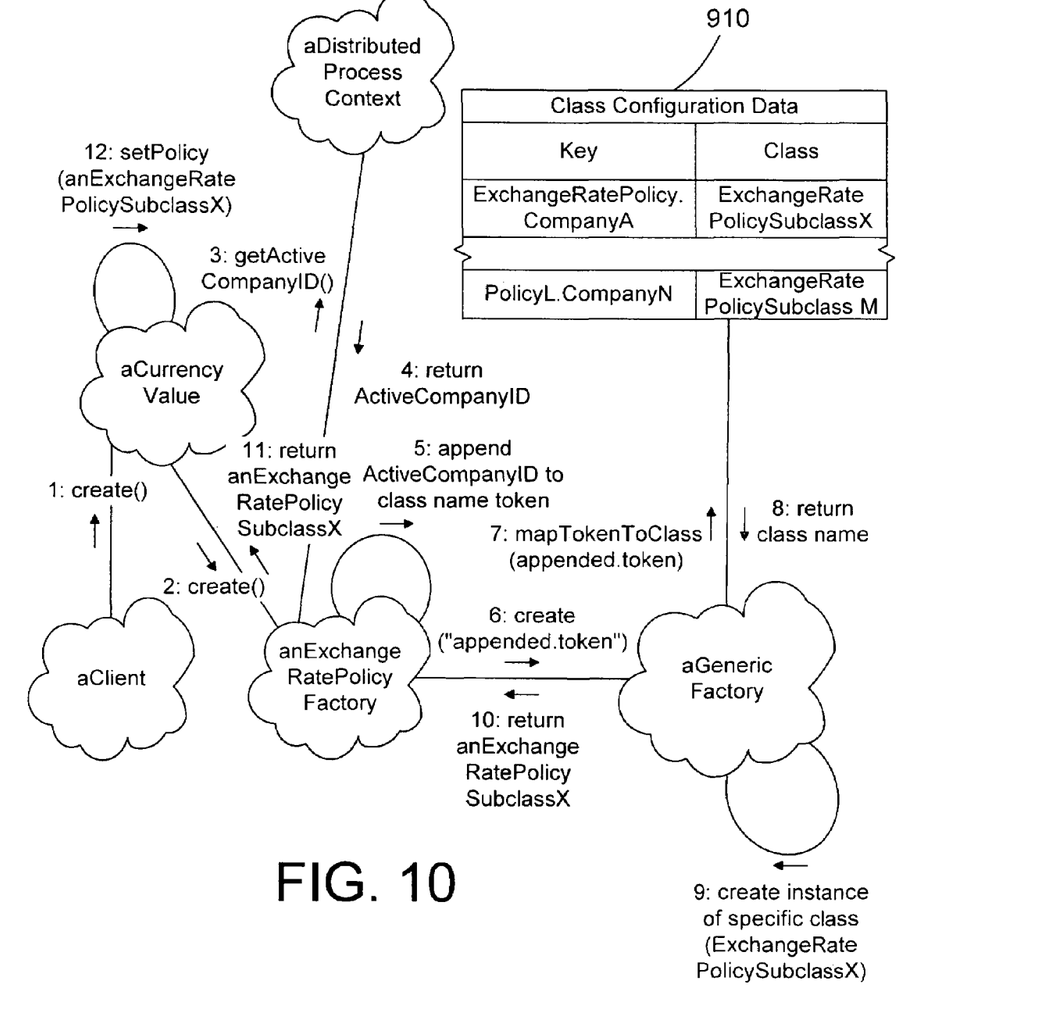
FIG. 10 is an object diagram illustrating a method in accordance with the preferred embodiments for instantiating a class in accordance with the flow diagram of FIG. 8 and the class diagram of FIG. 9.

The object diagram of FIG. 10 shows the steps in creating a CurrencyValue object in accordance with the method 800 of FIG. 8 using the classes and data structure for class configuration data shown in FIG. 9. First, a client object invokes the create( ) constructor method on the CurrencyValue class (step 1). In response, the create( ) constructor method on a factory for the ExchangeRatePolicy class in invoked (step 2). However, it is not known at this time which subclass of ExchangeRatePolicy to instantiate, so the create( ) constructor invokes the getActiveCompanyID( ) method on the aDistributedProcessContext object (step 3), which returns the ActiveCompanyID (step 4). Note that the aDistributedProcessContext object is local to the ExchangeRatePolicyFactory, and therefore retrieving the active company ID is an efficient operation. This eliminates the need to access a remote object to retrieve context information, as is the case in FIG. 4. Next, the active company ID is appended to the class name token (step 5). In the preferred embodiment, this is done by invoking the appendToken( ) method on the ExchangeRatePolicyFactory (see FIG. 9). Next, the create( ) method on the aGenericFactory object is invoked, passing the appended token (referred to in FIG. 10 as "appended.token") as a parameter (step 6). In response, the generic factory invokes a mapTokenToClass( ) function, passing the appended token as a parameter (step 7). The appended token is used as a key to look up the corresponding specific class name in the data structure 910, and the specific class name is returned (step 8). The GenericFactory then creates an instance of the specified class (step 9). This instance is then returned to the ExchangeRatePolicyFactory (step 10). Finally, the newly-created aExchangeRatePolicy object is returned to the constructor for the CurrencyValue class (step 11), and the setpolicy( ) method is invoked, passing the aExchangeRatePolicy object as a parameter (step 12), which causes the instance of the CurrencyValue to contain the appropriate ExchangeRatePolicy object.

The preferred embodiments of the present invention presented herein provide a way to perform class replacement using external configuration data while scoping the entries in the configuration data to particular processing contexts. In this manner, class replacement can be context-specific, thereby allowing different contexts to reference different classes depending on their specific needs. The data structure for the class configuration data is still globally accessible in the preferred embodiments, but the entries are individually scoped to their respective contexts by including context information in the key.

The embodiments and examples set forth herein were presented in order to best explain the present invention and its practical application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the forthcoming claims. For example, while a class CurrencyValue is used herein for the purpose of illustration, any suitable class may be used that could benefit from context-based class replacement.

What is claimed is:

1. An apparatus comprising:
   at least one processor;
   a memory coupled to the at least one processor;
   class configuration data comprising a plurality of entries residing in the memory, each class configuration entry including a key-value pair, wherein the key includes information relating to a selected processing context and the value includes configuration data for a class in the selected processing context, wherein the key comprises context information appended to a class identifier; and
   an object oriented class replacement mechanism residing in the memory and executed by the at least one processor that generates an instance of a selected class by using a key that includes context information to access the appropriate entry in the class configuration data.

2. The apparatus of claim 1 wherein the class identifier comprises a class token that comprises a text string.

3. The apparatus of claim 1 further comprising a factory object that generates an instance of the selected class by accessing the appropriate entry in the class configuration data using the key.

4. The apparatus of claim 1 further comprising a key generator mechanism that generates the key from a class identifier and from the context information.

5. A computer-implemented method for replacing an existing class with a replacement class in a distributed object environment, the method comprising the steps of:
   (1) generating a key that comprises information relating to a current processing context appended to a class identifier for the existing class;
   (2) storing configuration data for the existing class using the key;
   (3) replacing the configuration data for the existing class with configuration data for the replacement class while maintaining the same key;
   (4) initiating the creation of an instance of the replacement class;
   (5) retrieving the configuration data for the replacement class using the generated key; and
   (6) creating an instance of the replacement class according to the retrieved configuration data for the replacement class.

6. An apparatus comprising:
   at least one processor;
   a memory coupled to the at least one processor;
   class configuration data comprising a plurality of entries residing in the memory, each class configuration entry including a key-value pair, wherein the key includes information relating to a selected processing context and the value includes configuration data for a class in the selected processing context;
   a key generator mechanism residing in the memory and executed by the at least one processor that generates the key from the class identifier and from the context information, wherein the key comprises the context information appended to a text string class identifier; and
   an object oriented class replacement mechanism residing in the memory and executed by the at least one processor that generates an instance of a selected class by using the key to access the appropriate entry in the class configuration data, the class replacement mechanism comprising a factory object that generates an instance of the selected class by accessing the appropriate entry in the class configuration data using the key.

7. A computer-readable program product on recordable media, the program product comprising:
   an object oriented class replacement mechanism that generates an instance of a selected class by using a key that includes information relating to a selected processing context to access an appropriate entry in class configuration data stored external to the class, wherein the key comprises context information appended to a text string class identifier, the class replacement mechanism comprising a factory object that generates an instance of the selected class by accessing the appropriate entry in the class configuration data using the key, the class replacement mechanism further comprising a key generator mechanism that generates the key from the text string class identifier and from the context information; and
   signal bearing media bearing the object oriented class replacement mechanism.

* * * * *